2 Sheets—Sheet 1.

S. S. REMBERT & J. PRESCOTT.
FIELD COTTON PICKER.

No. 7,631. Patented Sept. 10, 1850.

2 Sheets—Sheet 2.

S. S. REMBERT & J. PRESCOTT.
FIELD COTTON PICKER.

No. 7,631. Patented Sept. 10, 1850.

UNITED STATES PATENT OFFICE.

SAMUEL S. REMBERT AND JEDEDIAH PRESCOTT, OF MEMPHIS, TENNESSEE.

IMPROVEMENT IN PICKING COTTON FROM THE BOLLS IN THE FIELD.

Specification forming part of Letters Patent No. 7,631, dated September 10, 1850.

*To all whom it may concern:*

Be it known that we, SAM. S. REMBERT and JEDEDIAH PRESCOTT, of Memphis, in the county of Shelby and State of Tennessee, have invented a new and improved machine for picking or gathering cotton from the bolls upon the stalks of the plant while they are standing in the field; and we do hereby declare that the following is a full and exact description thereof, reference being had to the accompanying drawings, making a part of this specification.

Figure 1:
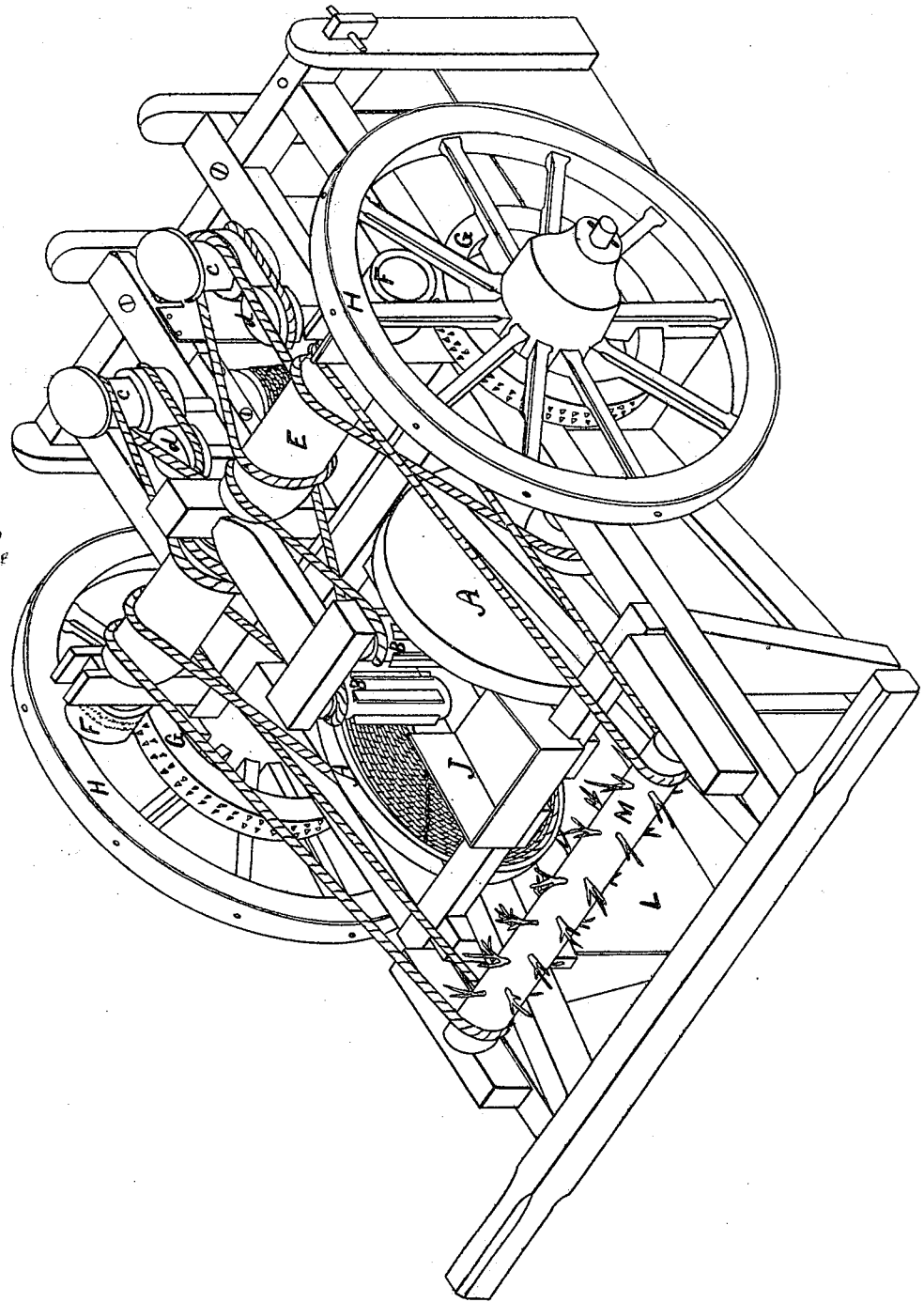
Figure 2:
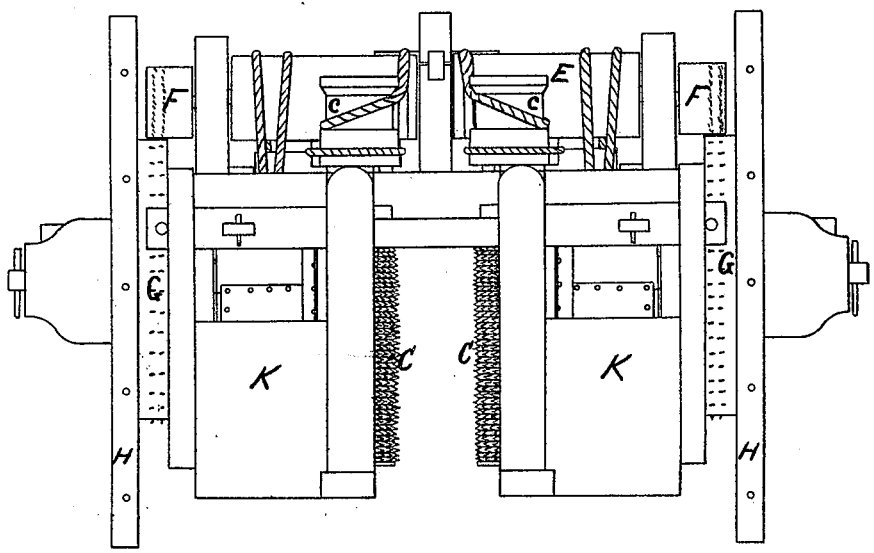
Figure 3:
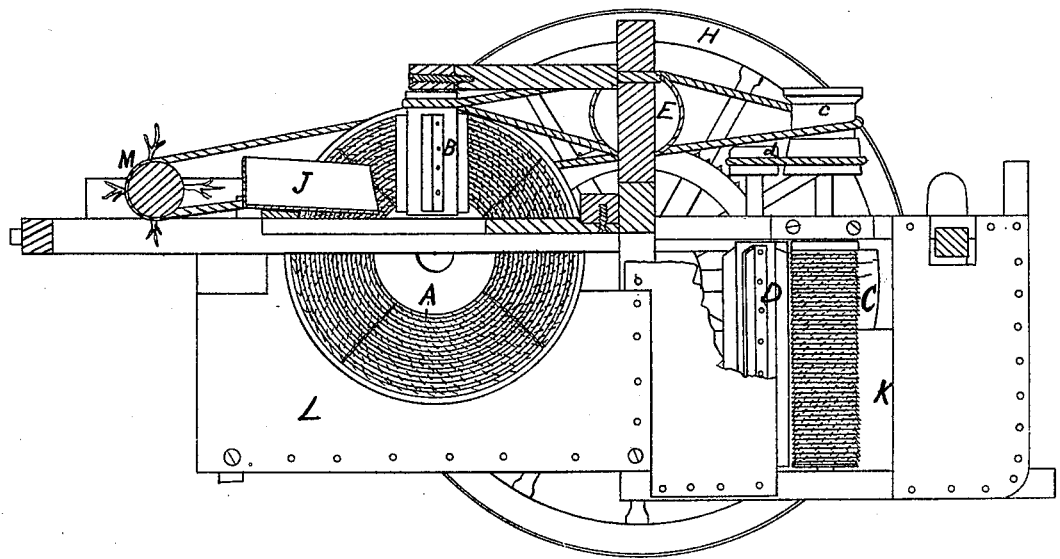

Figure 1 is a perspective view of our cotton-picker; Fig. 2, an elevation of its rear end, and Fig. 3 a longitudinal vertical section through the center of the machine.

Similar letters indicate like parts in all the figures.

Our cotton-picker is composed of a frame of suitable strength, mounted upon the axle of two (or more) high wheels, substantially as represented in the drawings, with which frame are combined the whipping-shaft M, the inclined gathering-planes L L, the picking-disks A A and picking-cylinders C C, the stripping-cylinders B D, and cotton-receptacles J K, arranged and operating substantially in the manner represented by the drawings, and hereinafter set forth.

The wheels H H must be of sufficient height to enable the axle-tree to pass above the tops of the cotton-plants, and the distance that they are placed from each other is equal to the space between the different rows of the cotton-plants.

The planes L L incline inward toward each other from their front to their rear ends, and are made fast to descending portions of the supporting-frame. When the machine is operated in the cotton-field, the wheels pass between a couple of rows and embrace a row of cotton-plants between the inclined planes L L. The cotton-plants are first operated upon by the whipping-cylinder M, the switches radiating from which detach the leaves from the plants and open the bolls to the free action of the pickers.

The picking-disks A A are secured to the inner ends of horizontal shafts placed obliquely to each other and secured in suitable bearings. The faces of the disks A A are armed with sharp teeth, and descend a sufficient distance below their axles to take hold of the lowest bolls upon the cotton-plants. By the forward movement of the machine the picking-disks A A are rotated, and the teeth upon their faces take hold of and draw the cotton from the bolls and carry it upward to the strippers or winged cylinders B B, which, by their rapid revolutions in immediate proximity to the faces of the disks, remove the cotton therefrom and deposit it in the receptacle J.

Near the rear end of the machine are placed the vertical picking-cylinders C C, which have their peripheries armed with sharp picking-teeth. The picking-cylinders C C project inward through openings in the portions of the rear ends of the planes L L, that form the sides of the cotton-receptacles K K, a sufficient space being left at the rear of the cylinders for the cotton gathered by the teeth on their peripheries to pass into the receptacles K K. The cotton is removed from the cylinders C C by the rapidly-revolving strippers or winged cylinders D D, placed in close proximity to the peripheries of the cylinders within the cotton-receptacles K K.

We shall generally place the disks A A upon their axles in such a manner that their positions can be adjusted in or out, or in such a manner that they shall be forced inward by springs and rendered self-adjusting in their positions. We shall also secure the picking-cylinders C C in bearings arranged in such a manner that their positions can be adjusted in or out, or in such a manner that they will be self-adjusting in their positions by the aid of spring-bearings. We shall use the picking-disks in combination with the picking-cylinders in the same machine, or we shall employ either a series of picking-disks or a series of picking-cylinders in a machine, as we may deem expedient, as there is no difference in principle, whether we make use of disks or cylinders in our cotton-picking machine for gathering the cotton from the bolls.

Our cotton-picking machine may be multiplied and extended to such a width as to embrace several rows of cotton-plants at once.

The picking disks and cylinders and the strippers or winged cylinders are driven by bands connecting them with the drum E, as represented. The drum E is driven by the friction-pulleys F F at the extremities of its shaft, bearing against the friction-wheels G G, secured to the spokes of the wheels H H; or, instead of the friction-wheels for imparting motion to the drum E, cog-wheels may be employed.

Having thus fully described our machine for picking or gathering cotton from the bolls upon the stalks of the plants while they are standing in the field, what we claim as our invention, and desire to secure by Letters Patent, is—

1. The combination of the whipping-cylinder M with the picking-disks A A and the strippers B B, and also the combination of the whipping-cylinder M with the picking-cylinders C C and the strippers D D, substantially in the manner and for the purpose as herein set forth.

2. The combination of the picking-disks A A and the strippers B B with the gathering-planes L L and the cotton-receptacle J, substantially in the manner and for the purpose as herein set forth.

3. The combination of the picking-cylinders C C and the strippers D D with the gathering-planes L L and the cotton-receptacles K K, substantially in the manner and for the purpose herein set forth.

Not intending by the above claims, however, to limit ourselves to any precise mechanical construction and arrangement of parts, but to vary the same as we may deem expedient, while we attain the same end by means substantially the same as those herein represented and described.

In testimony that the above is a specification of our machine for gathering cotton from the bolls in the field we have hereunto subscribed our names.

SAML. S. REMBERT,
JEDEDIAH PRESCOTT.

Witnesses to the signature of Saml. S. Rembert:
    J. HARDING,
    C. C. COLUM.

Witnesses to the signature of Jedediah Prescott:
    Z. C. ROBBINS,
    R. W. WILCOX.